United States Patent [19]
Son et al.

[11] Patent Number: 6,005,683
[45] Date of Patent: Dec. 21, 1999

[54] DOCUMENT EDGE DETECTION BY LINEAR IMAGE SENSOR

[75] Inventors: Myungsae Son, Rancho Santa Fe; John M. Weldon, San Diego, both of Calif.

[73] Assignee: Hewlett-Packard Company, Palo Alto, Calif.

[21] Appl. No.: 08/985,475

[22] Filed: Dec. 5, 1997

[51] Int. Cl.$^6$ .............................. H04N 1/04; H04N 1/40; G06K 9/36

[52] U.S. Cl. ........................ 358/488; 358/449; 358/520; 395/117; 382/286

[58] Field of Search .................................. 358/406, 504, 358/449, 488, 462, 505, 509, 519, 516, 477, 474, 475, 498, 520, 527, 296; 382/171, 286, 291, 274, 312, 317, 319; 355/408; 399/370, 371, 389; 395/117, 101, 105

[56] References Cited

U.S. PATENT DOCUMENTS

| | | | |
|---|---|---|---|
| 4,812,902 | 3/1989 | Fuchsberger | 358/80 |
| 4,945,351 | 7/1990 | Naiman | 340/793 |
| 5,140,444 | 8/1992 | Klein et al. | 358/447 |
| 5,170,152 | 12/1992 | Taylor | 340/703 |
| 5,185,673 | 2/1993 | Sobol | 358/296 |
| 5,483,625 | 1/1996 | Robertson et al. | 395/117 |
| 5,537,494 | 7/1996 | Toh | 382/242 |
| 5,568,281 | 10/1996 | Kochis et al. | 358/475 |
| 5,598,184 | 1/1997 | Barkans | 345/149 |
| 5,677,776 | 10/1997 | Matsuda et al. | 358/475 |
| 5,694,331 | 12/1997 | Yamamoto et al. | 364/514 A |
| 5,778,104 | 7/1998 | Kowalski | 382/261 |
| 5,787,199 | 7/1998 | Lee | 382/203 |
| 5,805,970 | 9/1998 | Kasamatsu | 399/376 |
| 5,818,976 | 10/1998 | Pasco et al. | 382/289 |

*Primary Examiner*—Madeleine Nguyen
*Attorney, Agent, or Firm*—Jerry R. Potts

[57] ABSTRACT

A technique for document edge detection in an optical scanning system. The document is placed against an oversized neutral background. A linear optical sensor array is used to provide successive lines of pixel data representing the luminance of detected pixel areas. Commencing from one end of the line of pixel data, for successive current pixels being tested, a group of n adjacent pixel values is correlated with a successive group of n adjacent pixel values to provide a correlation value for the current pixel. One of the groups is assumed to contain only background pixels, and their luminance is approximated to be equal to the average luminance over the entire background. If the correlation value exceeds a threshold constant, the current pixel is chosen to be an edge in this line of pixels. Data from several lines is processed to find corresponding edges for each line, and the line edges are subjected to a least squares fit to calculate the location of the document edge. The left and right edge of the document can be found using this technique. A histogram of luminance values for each line of pixel data is analyzed to determine whether an edge value is valid.

23 Claims, 3 Drawing Sheets

DOCUMENT EDGE DETECTION BY LINEAR IMAGE SENSOR

TECHNICAL FIELD OF THE INVENTION

This invention relates to optical scanning machines, and more particularly to techniques for automatically detecting the edges of the document as it is being fed through a document feed path.

BACKGROUND OF THE INVENTION

Optical scanners operate by imaging an object, typically from a sheet of paper, document or other form of medium, with a light source, and sensing a resultant light signal with an optical sensor array, with each optical sensor/pixel element in the array generating a data signal representative of the intensity of light impinging thereon for a corresponding portion of the imaged object. The data signals from the array are then processed, typically digitized, and utilized by a utilization apparatus or stored on a suitable medium such as a hard disk of a computer for subsequent display and/or manipulation.

Various types of photo sensor devices may be used in optical scanners. For example, a commonly used photo sensor device is the charge coupled device (CCD), which builds up an electrical charge in response to exposure to light. The size of the electrical charge built up is dependent on the intensity and duration of the light exposure. In optical scanners, CCD cells are typically arranged in linear arrays. Each cell or "pixel" has a portion of a scan line image impinged thereon as the scan line sweeps across the scanned object. The charge built up in each of the pixels is measured and discharged at regular "sampling intervals."

The image of a scan line portion of a document is projected onto the scanner's linear sensor array by scanner optics. In CCD scanners, the scanner optics typically comprise an imaging lens which typically reduces the size of the projected image from the original size of the document considerably. Pixels in a scanner linear photo sensor array are aligned in a "cross" direction, a direction perpendicular to the "scan" direction, i.e. the paper or scanner movement direction for scanning of the image.

At any instant when an object is being scanned, each pixel in the sensor array has a corresponding area on the object which is being imaged thereon. This corresponding area on the scanned object is referred to as an "object pixel." An area on a scanned object corresponding in area to the entire area of the linear sensor array is referred to as an "object scan line" or "scan line." For descriptive purposes, a scanned object is considered to have a series of fixed adjacently position scan lines. Scanners are typically operated at a scan line sweep rate such that one scan line width is traversed during each sampling interval.

Some optical scanner machines include an automatic document feeder for feeding a document past the optical array. Other optical scanner machines are known as "flatbed" scanners, wherein a document is placed on a fixed platen for scanning, which occurs by moving the sensor array relative to the fixed document.

It is advantageous in various applications to sense the location of a document edge. In a printer, for example, the print area differs depending on whether the printing on envelopes, name card paper, letter sized paper, and so on. The prediction of the print area assists in driving the print head. The print area can be identified by sensing the media edges. By identifying the document area, proper clipping can be made on both sides when printing. In a scanner, detection of the document edges can assist by placing the image area properly on the page, and by reducing the scan memory size by clipping the empty regions. Also, by detecting the edge position in the direction of document movement, the document skew can be estimated and used to redirect the scanned image in print. This will produce a more pleasing output from the scanning process.

Multi-function office products are in wide use today, which combine in a single machine the functions of printing and optical scanning with automatic document/sheet feeders.

This invention provides a technique for automatically detecting the left and right edges of a scanned target document as it is being fed through an automatic document feeder, and has particular utility in multi-function machines which include optical scanning with automatic document feeding capabilities.

SUMMARY OF THE INVENTION

In accordance with one aspect of the invention, a method for detecting edges of a document is described, and comprises the steps of:

placing the document against a background having a background width dimension larger than a document width dimension, with a portion of the background exposed along opposed edges of the document whose positions are to be detected;

illuminating the document with light from a light source;

capturing successive lines of pixel data representing luminance of scanned pixels, wherein a first group of pixels represents luminance of an exposed portion of the background and a second group of pixels represents luminance of the document;

processing a line of pixel data, by correlating, for successive current pixels, a group of n adjacent pixels with a successive group of n pixels to provide a correlation value $S_R$, comparing the correlation value with a predetermined threshold value, and selecting the current pixel as a line edge position if the correlation value exceeds the threshold value.

A calibration scan of the background is performed prior to the document scan to determine a background luminance value.

In accordance with another aspect of the invention, a system for detecting an edge of a document is described. The system includes an optical sensor array of sensor pixel elements, and a light for generating illumination light. A background surface is provided, having a width dimension wider than a corresponding width dimension of the document such that, when the document is placed on the background surface, a portion of the background surface is exposed along the edge of the document whose position is to be detected. Preferably the background surface is a neutral color such as gray. An optical apparatus directs the illumination light onto the background surface and document, and the light reflected from the background surface and document onto the sensor array. The system further includes a controller/processor for controlling the light source and processing successive lines of sensor pixel data generated by the sensor array. The controller/processor includes an algorithm function for processing a line of pixel data, by correlating, for successive current pixels, a group of n adjacent pixels with a successive group of n pixels to provide a correlation value $S_R$, comparing the correlation value with a predetermined threshold value, and selecting the current pixel as a line edge position if the correlation value exceeds the threshold value.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

According to one aspect of the invention, the scheme disclosed herein has a purpose of automatically detecting the edge of a scanned target as it is being fed through an automatic document feeder. Unlike a flatbed scanner, it may not be desirable or even possible to revisit the same scanned area of the target. Therefore, the edge detection in such a machine needs to be done in real time during scanning.

Figure 1:
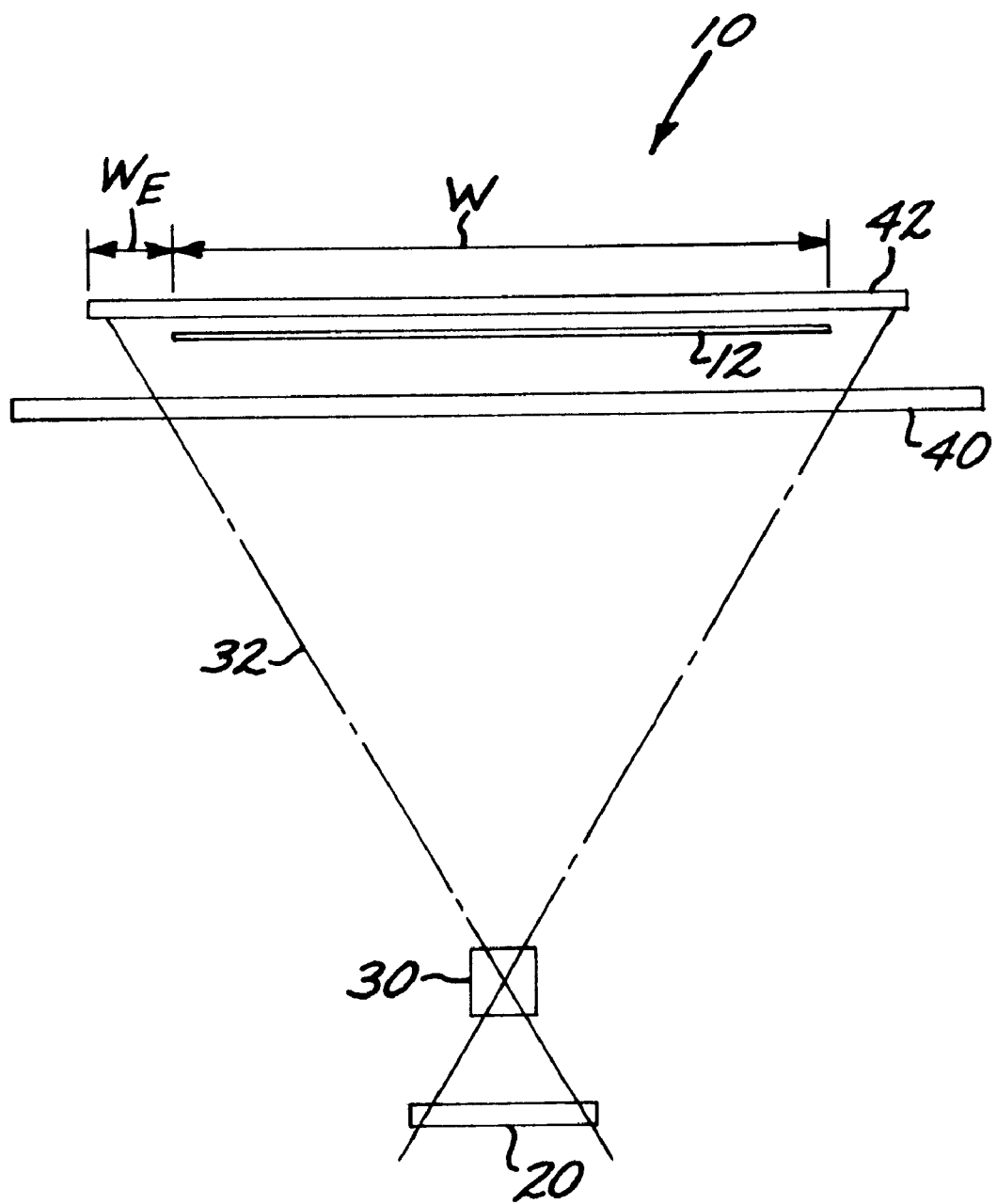
FIG. 1 is a simplified schematic diagram of an optical scanner system employing the invention.

This scheme is designed to take advantage of the characteristics of the optical scanner system, already integral to many image scanners and multi-function office products, to determine the location of the left and right edges of the target. FIG. 1 shows in simplified schematic form an optical scanner system 10. The system 10 includes a linear sensor/CCD device 20, which contains enough sensor elements to cover the full width W of the target document 12 with some extra width $W_E$ on both sides. This extra width will allow the algorithm to distinguish between the background 42 and the edge of the target. The scanner system includes lens reduction optics 30 and an optical path 32. An illumination light source 40 generates light which illuminates the document and background, and is assumed to be a Lambertian source for this application. The light illuminated at the edge of the document scatters and causes a disturbance in the continuity of luminance, which assists edge detection. A neutral tone background is used as an optical reference. Using a neutral tone background, as opposed to a white background, is not necessary, but helps to enhance the contrast between the background and a conventional document on paper.

The background is selected to ideally have uniform reflectance. However, in reality a background surface will include impurities and non-uniformities in reflectance, which brings in noise in electrical signals. Noises other than the noise from background consist of random noise and Shot noise. The random noise is relatively small compared to Shot noise under illumination; the Shot noise is dominant when the light intensity is strong. The background material color is chosen to be non-white but grayish to reduce the Shot noise effect. The grayish background also helps to distinguish ordinary documents which are mostly white paper base. The neutral grayish background does not affect imaging during the scanning function, as the signal from the background can be scaled correspondingly to the selected white objective. The noise involvement demands statistical handling of sensed data through the CCD sensor to improve the robustness of the edge detection operation.

The optical scanner can further include a mechanical document feeder system through which the document passes, between the CCD and the background.

The identification of the document edges is made by having a priori knowledge of the image of the background alone, and by comparing that background image with the document image. The background information is obtained before document scanning begins. The algorithm detects contrast changes from the background only area to the document. The correlation of the background-only image and the document non-existent area is high as the scanner is scanning the same background area. The correlation of the background-only image and the document image is either low or changes suddenly at the edge of the document. The information in the document non-existent (background-only) area is available as the scan image size is larger than the document size in scanners and multi-function office products.

The pixel data from the scanner 10 will serve as the input to the edge detection scheme. The scanner output video signal has intrinsic variations over the scan width due to non-uniformities of sensor array sensitivity and light illumination. These non-uniformities can be compensated by normalizing the scanned pixel data to the reference background. If a neutral-density background is used, the video signal values will need to be scaled such that the neutral background can be used for normalization as if it were a white background. The normalization can be performed in the following manner. A calibration is done before the document is scanned. Several rows of the background are acquired, and an average is taken over all the rows for each pixel. This average represents the background luminance for a particular pixel. Characteristics of CCD arrays in scanners that have to be compensated for include dark voltage and photo response nonuniformity (PRNU). The dark voltage is the voltage from a CCD element when no light is incident on the element. PRNU is the pixel-to-pixel variation in a CCD array's response to a fixed-intensity light.

A CCD element with no light illuminating the element should be at zero volts. In reality, CCD elements have leakage current that causes nonzero voltage even when no light illuminates the element. The amplifiers in CCD arrays also have nonzero offset voltages.

CCD elements are not identical in their response to light. A scanner measures PRNU in a test scan of a built-in calibrated background strip. The output of each CCD element is compared to the expected voltage for that background. PRNU is recorded for each pixel because each CCD element is slightly different.

After the scanner system measures PRNU and dark voltage for each pixel, it compensates for these characteristics with either a digital or analog compensation value for each pixel.

To further illustrate the normalization, assume that the video data from the whitest background display is at 245 out of 256 in gray resolution. If the neutral density background is chosen to have a video count value of 128, the scaling to the white is done by multiplying (245/128) with the scanned data. The full 256 count value is not used to provide some margin for an abnormally high intensity site. This multiplication factor is not applied before the document area is identified. While the system is detecting the edge at the beginning, the raw line data will contain the neutral density background at the beginning and ending of the line. The middle part of the line will contain the pixel data of unprinted document areas and printed areas. The enhanced contrast at the interface area of the background and the document will assist in acquiring a sharper transition edge in detection. Once the document area is identified, any video signal in the document area is normalized to the whitest white background assumed by the system. If the normalized video signa intensity has a count of 256, that means the scanned spot displays the whitest white in the document. If the count is 10, the scanned spot is close to dark black. To scale to the whitest white from the neutral density background, the background data is multiplied with (245/128). The rest of the process is the same as with the white background.

After a line of pixels has been scanned and normalized, it will be processed according to the edge detection algorithm. The leftmost and rightmost pixels will contain a width of background pixels due to the CCD scanner being wider than the target document. Most commercially available CCD devices contain sufficient spare pixels beyond the of size A-4 and A paper, and so most scanners already provide this capability. The edge being detected is defined as the location where pixels change from being background pixels to target document pixels.

There is typically a small shadow in the edge location due to the gap height between the scanner window and the background. This gap is to accommodate a variety of target document thicknesses, and will vary widely depending on the thickness of the target document. It is usual to control this gap between 0.5 mm and 1 mm. Within this limit, the document edge shape would not affect the shadow width significantly under the scanner illumination system. Nevertheless, this is also compensated by correlating using a group of pixels at a time, thereby reducing the effect of small variations in the scan line.

The Algorithm. The general concept of this edge detection scheme is to compare the luminance of the scanned pixels with the known background luminance through mathematical correlation.

To desensitize this algorithm to variations in pixel levels due to noise, a group of n adjacent pixels is correlated with a successive group of n pixels, where n is chosen to maximize robustness without sacrificing the sharpness of the edge transition detection. Due to inaccuracies in the scanner system, it is typically necessary to use n greater than 1; otherwise pixel noise or dust on the platen glass could cause an incorrect edge to be detected. A large value for n provides a more robust detection, yet the edge transition is slow. If n is too large, the edge may never be detected unless there is a very large difference in the luminance of the document near the edge and the luminance of the background. Thus, n should be chosen appropriately to balance these two criteria. Experimentally, in applications involving 600 dpi scanner arrays, n=5 has been found to provide good results.

To simplify the correlation calculation, one of the groups is assumed to contain only background pixels, and their luminance is approximated to be equal to the average luminance over the entire background. Therefore, if p is defined as the current pixel being tested, and $L_B$ as the luminance of the background, the formula used for finding the correlation value is:

$$S_R = \sum_{i=p}^{p+n-1} (L_i - L_B)^r, \qquad (eq.1)$$

where r can be used to vary the sensitivity of the detection. As an example, if n=5 and r=2, the equation becomes:

$$S_R = (L_P - L_B)^2 + (L_{P+1} - L_B)^2 + (L_{P+2} - L_B)^2 + (L_{P+3} - L_B)^2 + (L_{P+4} - L_B)^2.$$

$S_R$ can then be checked to determine if it exceeds a predetermined threshold constant $S_{TH}$. If so, the pixel p is chosen to be the left edge in this line of pixels. Otherwise, p is incremented, and the formula is recalculated.

The value of $S_{TH}$ varies with the mechanical design of the paper feed and illumination system. However, with the 1 mm of gap between the paper and the scanner window, and a 45 degree illumination angle, the ratio of $S_R/S_{TH}$ is larger than 5.

This algorithm can be used similarly to find the right edge of the scanned image. For finding the right edge, the correlation formula becomes:

$$S_R = \sum_{i=p+n-1}^{p} (L_i - L_B)^r \qquad (eq.2)$$

In order to improve the robustness of the algorithm by reducing the possibility of false detection, signal binning can be used to get histogram data from the scanned page. For example, the pixel luminance can be binned in, for example, ten bins. Nine bins are for the luminance near that of the background, and one bin is for the rest. The distribution of the bins would be compared with the design parameters of the system to determine if the document is indistinguishable from the background. If the contrast between the background image and the document image is small, the detection algorithm would skip the line, thereby eliminating the possibility of detecting false edges.

This binning technique is not required for the edge detection process. At the edge of the document, a sufficient disturbance typically occurs in the signal, as the light scattering occurs at the edge, and the edge interface brings in contrast over the background. However, hypothetically, the document edge may be very smooth and the document optical density may be the same as that of the background, and so no contrast exists at all. If the application demands absolute robustness, the binning scheme will enhance the robustness by defaulting the edge detection process.

The binning technique can be further exemplified by the following example. Consider an X-Y bar chart, where X displays intensity from 0 to 256. Y displays the counts of pixels. The sum of the pixels amounts to the pixels in a line. Now assume a black-and-white type-written document. The histogram will show a large umber of pixel counts near 256 and another large number of pixels near zero. The population of pixels in the middle part of x, i.e. mid-range intensity, is very sparse. The population distribution displays the nature of the document.

System robustness is highly sought in the edge detection process. If the nature of the document is confusing and the system may compute a false edge location, it would be desirable, in the interests of robustness of edge detection, to suspend the edge detection process to avoid false information on the document location. The confusion may occur when the background and the document have no contrast. If a large population is occupying the background intensity bin, there is a chance for confusion. In this case, the detection process can be suspended for the current line, and the process continues to the next line. If the process is in default continuously for a predetermined distance, the system acknowledges the detection process should be suspended completely for the document.

Once edge pairs in X-Y coordinates are found for several lines, the edge of the document can be approximated for any arbitrary line, using least square fitting. The document feed error, document edge jaggedness, shadow and imaging noise contributes to threshold pixel site variations in each line. For an arbitrary line, $Y_n$, the edge, $X_i$, can be determined using $Y_i = aX_i + b$, where a and b can be approximated in the following manner. Given m pairs in X-Y coordinates, $$a + \frac{mA - BC}{E}, b + \frac{CD - AB}{E},$$

where $$A = \sum_{i=1}^{m} X_i Y_i, B = \sum_{i=1}^{m} X_i, C = \sum_{i=1}^{m} Y_i, D = \sum_{i=1}^{m} X_i^2, E = mD - 2B.$$

Alternatively, to determine the document edge after processing several (h) lines, the positional average (the sum of each threshold pixel site divided by h) of the threshold pixel sites can be used as the document edge.

Figure 2:
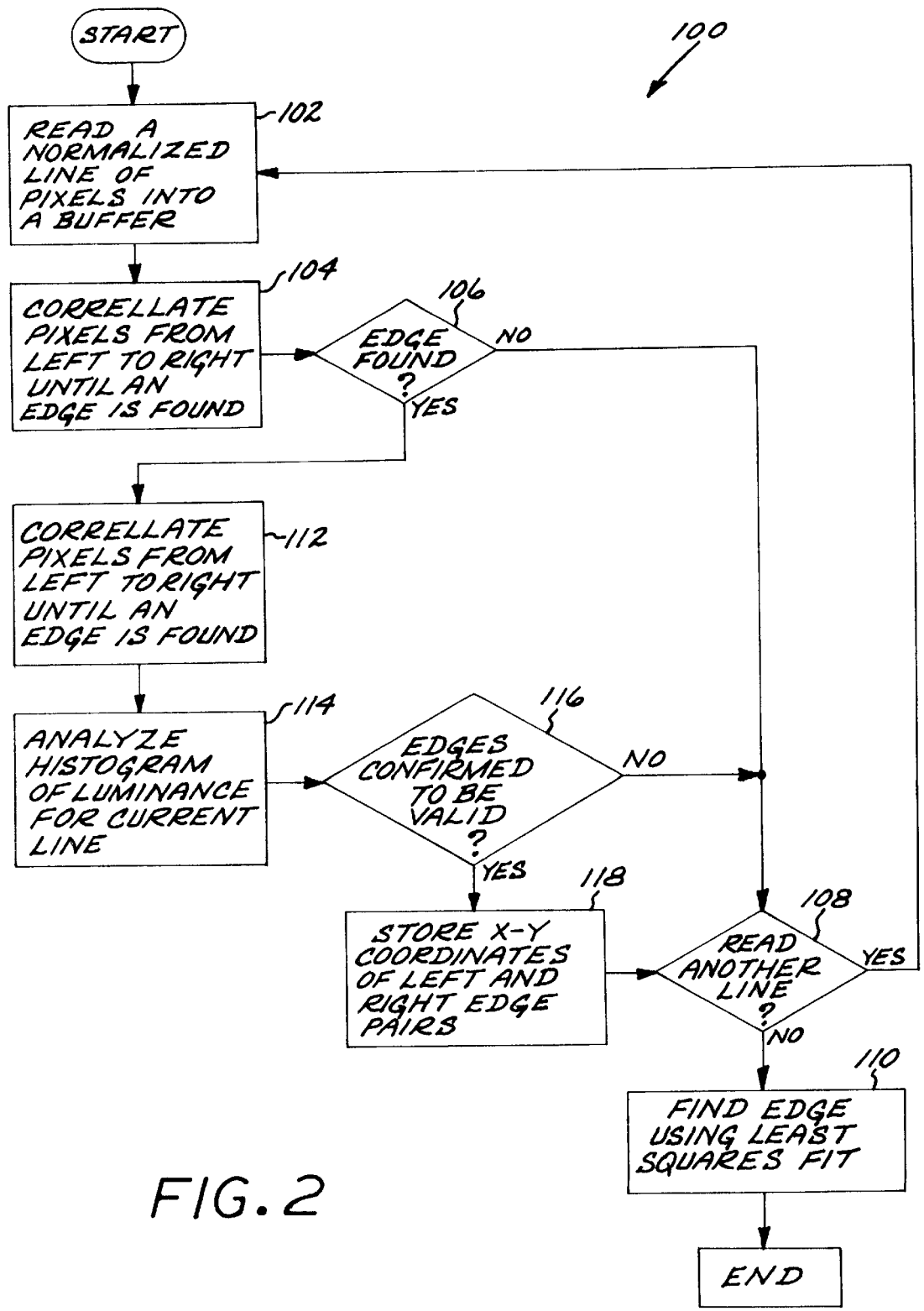
FIG. 2 is a simplified flow diagram illustrating an embodiment of the edge detection scheme in accordance with the invention.

FIG. 2 is a simplified flow diagram illustrating an embodiment of the edge detection scheme 100. At step 102, a normalized line of pixel data is read into a buffer. Next, at step 104, the pixels in the line are correlated from left to right until an edge is found, or until all pixels have been correlated. If an edge is not found (106), a decision is made as to whether to read another line of data into the buffer, i.e. whether the end of the page has been reached (step 108). If so, operation branches back to step 102. If not, then at step 110, the edge is found using a least squares fit, and the edge detection scheme ends.

Referring again to step 106, if an edge is found during the correlation process, at 112, the pixels are correlated from right to left until an edge is found. At step 114, a histogram of luminance for this line is analyzed. If the edges are determined to be valid at step 116 as a result of this analysis, then the X-Y coordinates of the left and right edge pairs are stored in memory, and operation proceeds to step 108.

Figure 3:
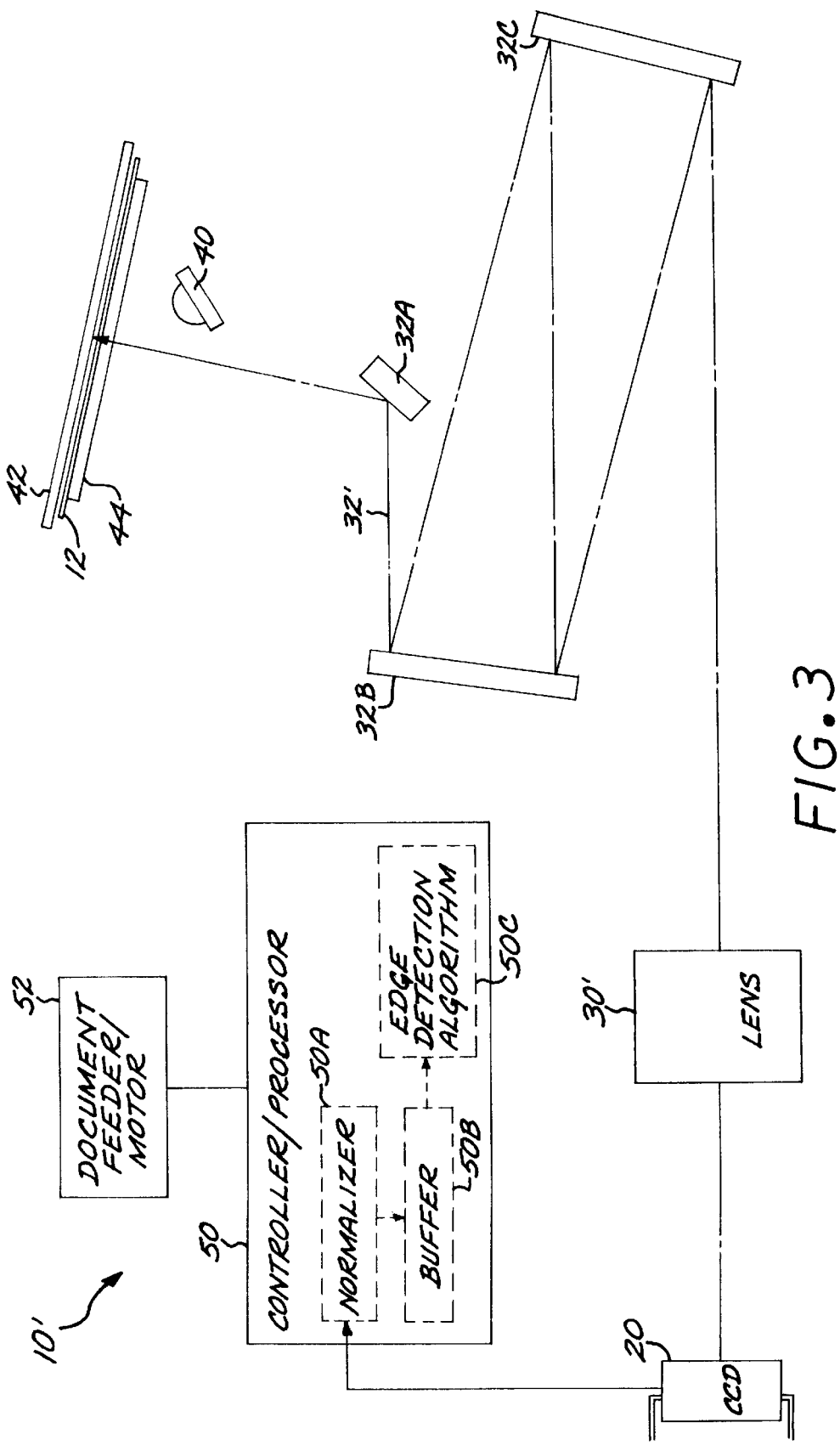
FIG. 3 illustrates an illustrative implementation of a system employing the edge detection algorithm in accordance with the invention.

FIG. 3 illustrates an illustrative implementation of a system 10' employing the edge detection algorithm in accordance with the invention. As in the system of FIG. 1, the system 10' includes a CCD sensor 20. The optical path 32' is folded by mirrors 32A, 32B and 32C to provide a more compact structure. The light source 40 illuminates the document 12 through a glass platen 44, against the neutral background 42. A lens 30' focuses the reflected light onto the linear sensor 20. The output of the sensor array is passed to the controller/processor 50, which includes a normalizer function 50A, a buffer 50B, and an edge detector algorithm function 50C to perform the algorithm 100 (FIG. 2). The processor can include a microprocessor programmed to perform the functions illustrated. The processor 50 provides control signals to the document feeder 52 to control its document advance motor. The edge data detected in accordance with the invention can be used to improve printing or scanning functions.

It is understood that the above-described embodiments are merely illustrative of the possible specific embodiments which may represent principles of the present invention. For example, while the invention has been described in connection with a scanner having an automatic document feeder, i.e. a scroll-fed feeder, the algorithm also has utility with other types of scanners, e.g. flatbed scanners. Other arrangements may readily be devised in accordance with these principles by those skilled in the art without departing from the scope and spirit of the invention.

What is claimed is:

1. A method for detecting edges of a document, comprising the steps of:

positioning the document against a background having a background width dimension larger than a document width dimension, with a portion of the background exposed along opposed edges of the document whose positions are to be detected;

illuminating the document with light from a light source;

capturing successive lines of pixel data representing luminance of scanned pixels, wherein a first group of pixels represents luminance of an exposed portion of the background and a second group of pixels represents luminance of the document;

processing a line of pixel data, by correlating, for successive current pixels, a group of n adjacent pixels with a successive group of n pixels to provide a correlation value $S_R$, comparing the correlation value with a predetermined threshold value, and selecting a current pixel as a line edge position if the correlation value exceeds the threshold value, and wherein said correlating step employs, for each pixel in a group, a pixel value of $(L_i - L_B)^r$, where $L_i$ represents a luminance value for the pixel, $L_B$ represents a background luminance value, and r is a parameter which affects a sensitivity of the detection.

2. The method of claim 1 further comprising the step of performing a calibration scan of the background to determine said background luminance value.

3. The method of claim 2 wherein said step of processing said line of pixel data includes calculating the correlation value $S_R$ in accordance with the following formula to detect a left edge:

$$S_R = \sum_{i=p}^{p+n-1} (L_i - L_B)^r,$$

where p is the current pixel being tested.

4. The method of claim 2 wherein said step of processing said line of pixel data is to detect a right edge, and includes calculating the correlation value $S_R$ in accordance with the following formula:

$$S_R = \sum_{i=p+n-1}^{p} (L_i - L_B)^r,$$

where p is the current pixel being tested.

5. The method of claim 1 wherein said background has a neutral coloration.

6. The method of claim 5 wherein said coloration is a grayish color.

7. The method of claim 1 wherein the step of processing a line of pixel data is repeated for a successive number of pixel data lines to provide a plurality of line edge locations, and further comprising the step of processing the line edge values for the processing pixel lines to determine the position of the document edge.

8. The method of claim 7 wherein the step of processing the line edge values includes performing a least squares fitting process to calculate the position of the document edge.

9. The method of claim 7 further comprising the step of testing the contrast of the first group of pixels to the second group of pixels for each line of pixel data processed, and discarding the line edge value if the contrast is small.

10. The method of claim 1 further comprising the step of normalizing the pixel data to a reference background.

11. A method for finding left and right edges of a document, comprising the following steps:

placing the document against a background having a background width dimension larger than a document width dimension, with a portion of the background exposed along opposed left and right edges of the document whose positions are to be detected;

illuminating the document with light from a light source;

capturing successive lines of pixel data representing luminance of scanned pixels using a linear sensor array, wherein a first group of pixels represents luminance of a first exposed portion of the background adjacent the left edge of the document, a second group of pixels represents luminance of the document, and a third group of pixels represents a second exposed portion of the background adjacent the right edge of the document;

processing a line of pixel data, by correlating, for successive current pixels commencing at a first end of the line corresponding to a left end of the sensor array, a group of n adjacent pixels with a successive group of n pixels to provide a correlation value $S_R$, comparing the correlation value with a predetermined threshold value, and selecting the current pixel as a line left edge position if the correlation value exceeds the threshold value; and processing said line of pixel data, by correlating, for successive current pixels commencing at a second end of the line corresponding to a right end of the sensor array, a group of n adjacent pixels with a successive group of n pixels to provide a correlation value $S_R$, comparing the correlation value with said predetermined threshold value, and selecting a current pixel as a line right edge position if the correlation value exceeds the threshold value; and wherein said correlating steps employ, for each pixel in a group, a pixel value of $(L_i-L_B)^r$, where $L_i$ represents a luminance value for the pixel, $L_B$ represents a background luminance value, and r is a parameter which affects a sensitivity of the detection.

12. The method of claim 11 further comprising the steps of storing said line left edge position and said line right edge position, repeating said steps of processing said line of pixel data for successive lines of pixel data, and finding said left and right edges of said document by processing said line left edge values and the line right edge values.

13. The method of claim 12 wherein the step of processing the line edge values includes performing a least squares fitting process to calculate the position of the document left and right edges.

14. A system for detecting an edge of a document, comprising:

an optical sensor array of sensor pixel elements;

a light source for generating illumination light;

a background surface having a width dimension wider than a corresponding width dimension of the document such that, when the document is placed on the background surface, a portion of the background surface is exposed along the edge of the document whose position is to be detected;

an optical apparatus for directing the illumination light onto the background surface and document and directing a light reflected from the background surface and document onto the sensor array;

a controller/processor for controlling the light source and processing successive lines of sensor pixel data generated by the sensor array, the controller/processor including an algorithm function for processing a line of pixel data, by correlating, for successive current pixels, a group of n adjacent pixels with a successive group of n pixels to provide a correlation value $S_R$, comparing the correlation value with a predetermined threshold value, and selecting a current pixel as a line edge position if the correlation value exceeds the threshold value, and wherein said algorithm function employs, for each pixel in a group, a pixel value of $(L_i-L_B)^r$, where $L^i$ represents a luminance value for the pixel, $L_B$ represents a background luminance value, and r is a parameter which affects a sensitivity of the detection.

15. The system of claim 13 wherein the processor/controller is further adapted to perform a calibration scan of the background and to process resultant sensor signals to determine said background luminance value.

16. The system of claim 14 wherein said algorithm function includes calculating the correlation value $S_R$ in accordance with the following formula to detect a left edge:

$$S_R = \sum_{i=p}^{p+n-1} (L_i - L_B)^r,$$

where p is the current pixel being tested.

17. The system of claim 15 wherein said algorithm function includes calculating the correlation value $S_R$ in accordance with the following formula to detect a right edge:

$$S_R = \sum_{i=p+n-1}^{p} (L_i - L_B)^r,$$

where p is the current pixel being tested.

18. The system of claim 14 wherein said background surface has a neutral coloration.

19. The system of claim 18 wherein said coloration is a grayish color.

20. The system of claim 14 wherein the processor/control algorithm function is further adapted to repeat the processing a line of pixel data is repeated for a successive number of pixel data lines to provide a plurality of line edge locations, and to process the line edge values for the processing pixel lines to determine the position of the document edge.

21. The system of claim 20 wherein the processor/control function is further adapted to perform a least squares fitting process to the line edge values to calculate the position of the edge.

22. A method for detecting edges of a document, comprising the steps of:

performing a calibration scan of a background to determine a background luminance value;

placing the document against a background having a background width dimension larger than a document width dimension, with a portion of the background exposed along opposed edges of the document whose positions are to be detected;

illuminating the document with light from a light source;

capturing successive lines of pixel data representing luminance of scanned pixels, wherein a first group of pixels represents luminance of an exposed portion of the background and a second group of pixels represents luminance of the document;

processing a line of pixel data, by correlating, for successive current pixels, a group of n adjacent pixels with a successive group of n pixels to provide a correlation value $S_R$, comparing the correlation value with a predetermined threshold value, and selecting a current pixel as a line edge position if the correlation value exceeds the threshold value, wherein said step of processing said line of pixel data includes calculating, to determine a left edge, the correlation value $S_R$ in accordance with the following formula:

$$S_R = \sum_{i=p}^{p+n-1} (L_i - L_B)^r,$$

where p is the current pixel being tested, $L_B$ represents the background luminance value, $L_i$ represents the luminance of the ith pixel, and r is a parameter which affects a sensitivity of the detection.

23. A system for detecting an edge of a document, comprising:

an optical sensor array of sensor pixel elements;

a light source for generating illumination light;

a background surface having a width dimension wider than a corresponding width dimension of the document such that, when the document is placed on the background surface, a portion of the background surface is exposed along an edge of the document whose position is to be detected;

an optical apparatus for directing the illumination light onto the background surface and document and directing an light reflected from the background surface and document onto the sensor array;

a controller/processor for controlling the light source and processing successive lines of sensor pixel data generated by the sensor array, wherein the processor/controller is adapted to perform a calibration scan of the background and to process resultant sensor signals to determine a background luminance value, the controller/processor including an algorithm function for processing a line of pixel data, by correlating, for successive current pixels, a group of n adjacent pixels with a successive group of n pixels to provide a correlation value $S_R$, comparing the correlation value with a predetermined threshold value, and selecting the current pixel as a line edge position if the correlation value exceeds the threshold value, said algorithm function including calculating the correlation value $S_R$ in accordance with the following formula to determine a left edge:

$$S_R = \sum_{i=p}^{p+n-1} (L_i - L_B)^r,$$

where p is the current pixel being tested, $L_B$ represents the background luminance value, $L_i$ represents the luminance of the ith pixel, and r is a parameter which affects the sensitivity of the detection.

* * * * *